(12) United States Patent
Cha et al.

(10) Patent No.: US 11,528,426 B2
(45) Date of Patent: Dec. 13, 2022

(54) IMAGE SENSING DEVICE AND OPERATING METHOD THEREOF

(71) Applicant: SK hynix Inc., Gyeonggi-do (KR)

(72) Inventors: Su Ram Cha, Gyeonggi-do (KR); Seong Hee Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 151 days.

(21) Appl. No.: 17/025,290

(22) Filed: Sep. 18, 2020

(65) Prior Publication Data
US 2021/0314478 A1 Oct. 7, 2021

(30) Foreign Application Priority Data

Apr. 3, 2020 (KR) .................. 10-2020-0040958

(51) Int. Cl.
*G06T 5/00* (2006.01)
*H04N 5/235* (2006.01)
*G06T 5/40* (2006.01)

(52) U.S. Cl.
CPC ........... *H04N 5/2355* (2013.01); *G06T 5/002* (2013.01); *G06T 5/009* (2013.01); *G06T 5/40* (2013.01); *H04N 5/2351* (2013.01); *G06T 2207/20208* (2013.01)

(58) Field of Classification Search
CPC .... H04N 5/2355; H04N 5/2351; H04N 5/355; H04N 19/513; H04N 5/357; H04N 5/262; H04N 5/57; H04N 1/4074; G06T 5/002; G06T 5/009; G06T 5/40; G06T 2207/20208; G06T 5/50; G06T 5/003; G06T 2207/20004; G06T 2207/20012; G06T 2207/20221; G06T 3/4007; G06T 5/007; G06T 3/00; G06T 2207/20028; G06T 3/0031; G06T 2207/20008; G06T 2207/10141; G06T 7/44; G09G 2320/0666; G09G 2340/0428; G09G 2360/16; G09G 2320/0233; G06V 10/50; G06V 10/507; G06V 10/758; G06V 30/18086; G06V 30/18095; G06V 30/18073; G06K 9/00
See application file for complete search history.

(56) References Cited

U.S. PATENT DOCUMENTS

| | | | | |
|---|---|---|---|---|
| 8,743,158 | B2 * | 6/2014 | Kang | .................. G09G 3/3413 |
| | | | | 345/690 |
| 8,958,658 | B1 * | 2/2015 | Lim | .......................... G06T 5/40 |
| | | | | 382/167 |
| 10,089,936 | B2 * | 10/2018 | Han | .......................... G06T 5/40 |
| 2013/0322753 | A1 * | 12/2013 | Lim | .......................... G06T 1/20 |
| | | | | 382/167 |

(Continued)

FOREIGN PATENT DOCUMENTS

| EP | 2131569 A1 * | 12/2009 | ............ G06T 5/002 |
|---|---|---|---|
| KR | 10-1133520 | 4/2012 | |
| KR | 10-1365369 | 3/2014 | |

*Primary Examiner* — Jose L Couso
(74) *Attorney, Agent, or Firm* — IP & T Group LLP (57) ABSTRACT

Disclosed are an image sensing device and an operating method thereof, and the image sensing device may include: an image sensor including a plurality of pixels and suitable for generating an image based on incident light; and an image processor suitable for generating a high dynamic range (HDR) image based on the image and two or more pieces of tone mapping information, which are divided according to luminance.

16 Claims, 10 Drawing Sheets

(56) References Cited

U.S. PATENT DOCUMENTS

| | | | | |
|---|---|---|---|---|
| 2017/0289571 A1* | 10/2017 | El Mezeni | ............. | H04N 19/14 |
| 2018/0218481 A1* | 8/2018 | Evans | .................... | H04N 9/646 |
| 2018/0336669 A1* | 11/2018 | Mertens | ................ | H04N 5/265 |
| 2019/0335149 A1* | 10/2019 | Hirota | ...................... | H04N 5/20 |
| 2020/0320672 A1* | 10/2020 | Guermoud | ................ | G06T 5/50 |
| 2020/0351524 A1* | 11/2020 | Lee | ........................ | H04N 19/33 |
| 2021/0272250 A1* | 9/2021 | Pouli | ....................... | G06T 5/009 |

\* cited by examiner

IMAGE SENSING DEVICE AND OPERATING METHOD THEREOF

CROSS-REFERENCE TO RELATED APPLICATION (S)

This application claims priority under 35 U.S.C. § 119 to Korean Patent Application No. 10-2020-0040958, filed on Apr. 3, 2020, the disclosure of which is incorporated herein by reference in its entirety.

BACKGROUND

1. Field

Various embodiments of the present disclosure relate to a semiconductor design technique, and more particularly, to an image sensing device and an operating method thereof.

2. Description of the Related Art

Image sensing devices capture images using the property of a semiconductor which reacts to light. Generally, there are two types of image sensing devices: charge-coupled device (CCD) image sensing devices and complementary metal-oxide semiconductor (CMOS) image sensing devices. Recently, CMOS image sensing devices are widely used because the CMOS image sensing devices allow both analog and digital control circuits to be directly implemented on a single integrated circuit (IC).

SUMMARY

Various embodiments of the present disclosure are directed to an image sensing device that uses a semi-global tone mapping method in which a global tone mapping method and a local tone mapping method are combined, and an operating method of the image sensing device.

In accordance with an embodiment, an image sensing device may include: a tone mapping module suitable for generating, based on a previously-stored histogram, two or more pieces of tone mapping information, which are divided according to luminance; and a high dynamic range (HDR) image generation module suitable for generating an HDR image based on the tone mapping information and an image.

The tone mapping module may include: a clustering block suitable for generating, based on the histogram, two or more clustered histograms according to at least one threshold luminance value; and a tone mapping information generation block suitable for generating the tone mapping information based on the clustered histograms.

In accordance with an embodiment, an image sensing device may include: an image sensor including a plurality of pixels and suitable for generating an image based on incident light; and an image processor suitable for generating a high dynamic range (HDR) image based on the image and two or more pieces of tone mapping information, which are divided according to luminance.

The image processor may include: a tone mapping module suitable for generating the tone mapping information based on a previously-stored histogram; and an HDR image generation module suitable for generating the HDR image based on the tone mapping information and the image.

The tone mapping module may include: a clustering block suitable for generating, based on the histogram, two or more clustered histograms according to at least one threshold luminance value; and a tone mapping information generation block suitable for generating the tone mapping information based on the clustered histograms.

In accordance with an embodiment, an operating method of an image sensing device may include: generating a histogram based on a first image according to a global tone mapping scheme; generating, based on the histogram, two or more pieces of tone mapping information, which are divided according to luminance, according to a local tone mapping scheme; and generating a high dynamic range (HDR) image based on the tone mapping information and a second image.

The first image may correspond to a previous frame, and the second image may correspond to a current frame.

Each of the first and second images may correspond to a current frame.

The generating of the tone mapping information may include: generating, based on the histogram, two or more clustered histograms according to at least one threshold luminance value; generating, according to a stretching scheme, modified histograms corresponding to the clustered histograms; generating, according to a smoothing scheme, smoothed histograms corresponding to the modified histograms; and generating, based on the smoothed histograms, the tone mapping information including two or more tone mapping curves.

The generating of the tone mapping information may include: generating, based on the histogram, two or more clustered histograms according to at least one threshold luminance value; and generating, based on the clustered histograms, the tone mapping information including two or more tone mapping curves.

In accordance with an embodiment, an operating method of an image sensing device may include: generating, based on a histogram representing a frequency of pixels within an image according to luminance of the pixels, tone mapping information segmented into two or more groups with reference to one or more threshold luminance; and generating a high dynamic range (HDR) image based on the groups and either of the image and a subsequent image.

DETAILED DESCRIPTION

Various embodiments are described below with reference to the accompanying drawings to enable those skilled in the art to practice and easily carry out the present invention.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification, specify the presence of the stated elements and do not preclude the presence or addition of one or more other elements. Throughout the specification, a component identified in the singular does not necessarily mean that there is only one such component; unless stated or the context requires otherwise, there may be more than one such component. Also, throughout the specification, reference to "an embodiment" or the like is not necessarily to only one embodiment, and different references to any such phrase are not necessarily to the same embodiment(s).

Figure 1:
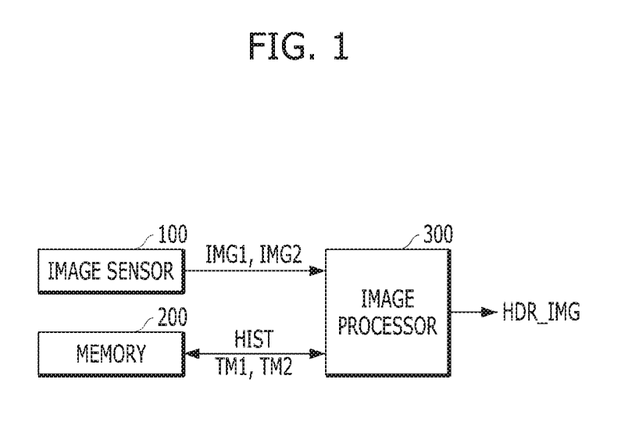
FIG. 1 is a block diagram illustrating an image sensing device in accordance with an embodiment.

FIG. 1 is a block diagram illustrating an image sensing device in accordance with an embodiment.

Referring to FIG. 1, the image sensing device may include an image sensor 100, a memory 200 and an image processor 300.

The image sensor 100 may generate an image for each frame based on incident light. Although not illustrated, the image sensor 100 may include a pixel array and a signal converter. The pixel array may include a plurality of pixels that generate image values based on the incident light. For example, the plurality of pixels may be arranged in a Bayer pattern. The signal converter may include a plurality of analog-to-digital (A/D) converters for converting the image values into digital values. The image may be represented by the digital values. Hereinafter, an image generated in a previous frame is referred to as a first image IMG1, and an image generated in a current frame is referred to as a second image IMG2.

The memory 200 may store a histogram HIST generated by the image processor 300, first tone mapping information TM1 and second tone mapping information TM2. The histogram HIST, the first tone mapping information TM1 and the second tone mapping information TM2 are described in detail below.

The image processor 300 may generate a high dynamic range (HDR) image HDR_IMG based on the first and second tone mapping information TM1 and TM2 and the first and second images IMG1 and IMG2. For example, the image processor 300 may generate the HDR image HDR_IMG through a semi-global tone mapping scheme in which a global tone mapping scheme and a local tone mapping scheme are combined.

Since the image sensor 100 and the memory 200 may be configured according to well-known technologies, only the image processor 300 is described in detail below.

Figure 2:
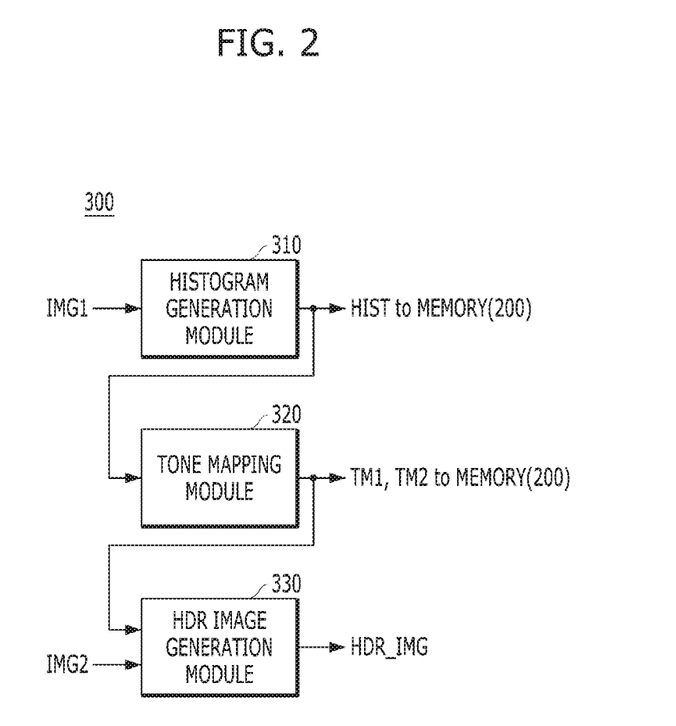
FIG. 2 is a block diagram illustrating an image processor, such as that illustrated in FIG. 1.

FIG. 2 is a block diagram illustrating the image processor 300 illustrated in FIG. 1.

Referring to FIG. 2, the image processor 300 may include a histogram generation module 310, a tone mapping module 320 and an HDR image generation module 330. The histogram generation module 310 may generate the histogram HIST based on the first image IMG1. The histogram HIST may represent a frequency of pixels according to luminance values. The frequency of the pixels refers to the number of pixels having corresponding luminance values. The histogram HIST may be stored in the memory 200.

The tone mapping module 320 may generate the first and second tone mapping information TM1 and TM2, which are divided according to luminance, based on the histogram HIST. For example, the first tone mapping information TM1 may include a first tone mapping curve for improving contrast of a relatively dark region of the first image IMG1, and the second tone mapping information TM2 may include a second tone mapping curve for improving contrast of a relatively light region of the first image IMG1. The first and second tone mapping information TM1 and TM2 may be stored in the memory 200.

The HDR image generation module 330 may generate the HDR image HDR_IMG based on the first and second tone mapping information TM1 and TM2 and the second image IMG2.

Figure 3:
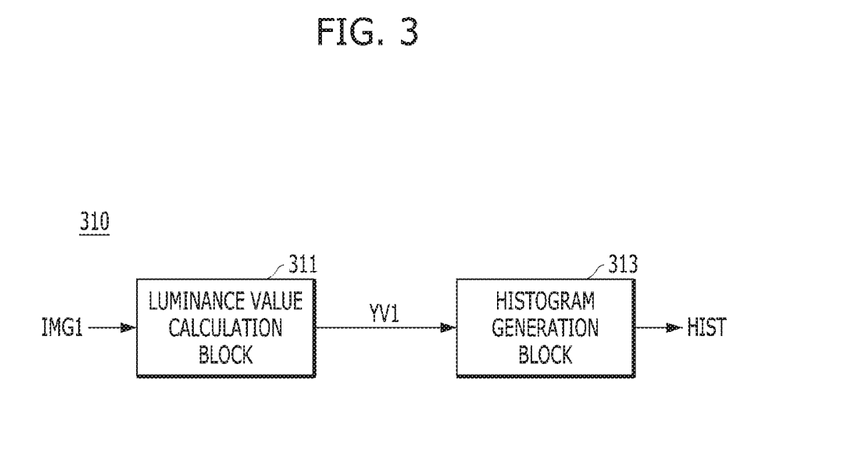
FIG. 3 is a block diagram illustrating a histogram generation module, such as that illustrated in FIG. 2.

FIG. 3 is a block diagram illustrating the histogram generation module 310 illustrated in FIG. 2.

Referring to FIG. 3, the histogram generation module 310 may include a luminance value calculation block 311 and a histogram generation block 313.

The luminance value calculation block 311 may calculate the luminance value for each pixel of the first image IMG1. For example, the luminance value calculation block 311 may calculate the luminance values, for each of the plurality of pixels, based on the digital values representing the first image IMG1 (refer to (A) and (B) of FIG. 6).

Figure 6:
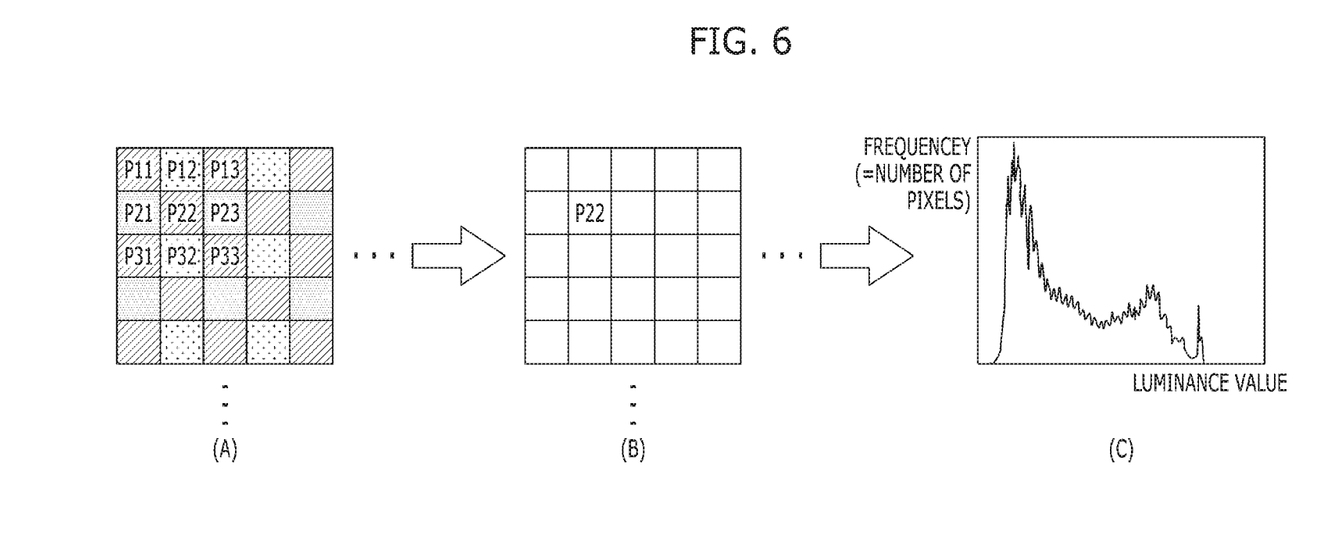
FIG. 6 is a diagram illustrating an operation of a histogram generation module, such as that illustrated in FIG. 2.

The histogram generation block 313 may generate the histogram HIST based on luminance values YV1 calculated by the luminance value calculation block 311 (refer to (C) of FIG. 6).

Figure 4:
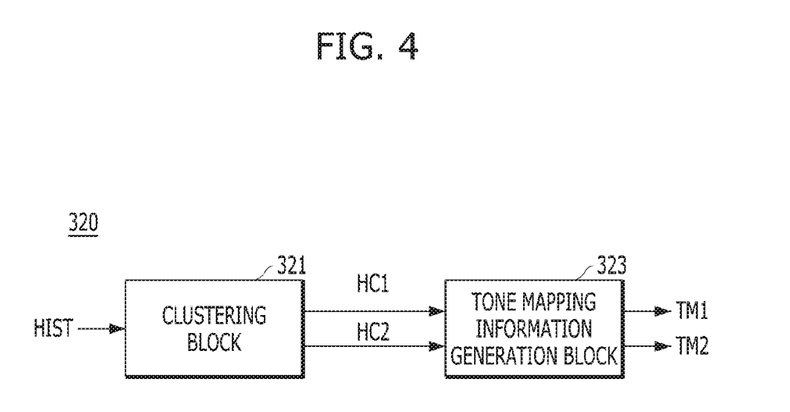
FIG. 4 is a block diagram illustrating a tone mapping module, such as that illustrated in FIG. 2.

FIG. 4 is a block diagram illustrating the tone mapping module 320 illustrated in FIG. 2.

Referring to FIG. 4, the tone mapping module 320 may include a clustering block 321 and a tone mapping information generation block 323.

The clustering block 321 may generate first and second clustered histograms HC1 and HC2 according to a threshold luminance value T based on the histogram HIST. For example, the clustering block 321 may count the frequency of pixels of each of multiple luminance values based on the histogram HIST, and generate the first and second clustered histograms HC1 and HC2 such that number of pixels in each of the first and second clustered histograms HC1 and HC2 is the same, according to the count result (refer to FIG. 7).

Figure 8:
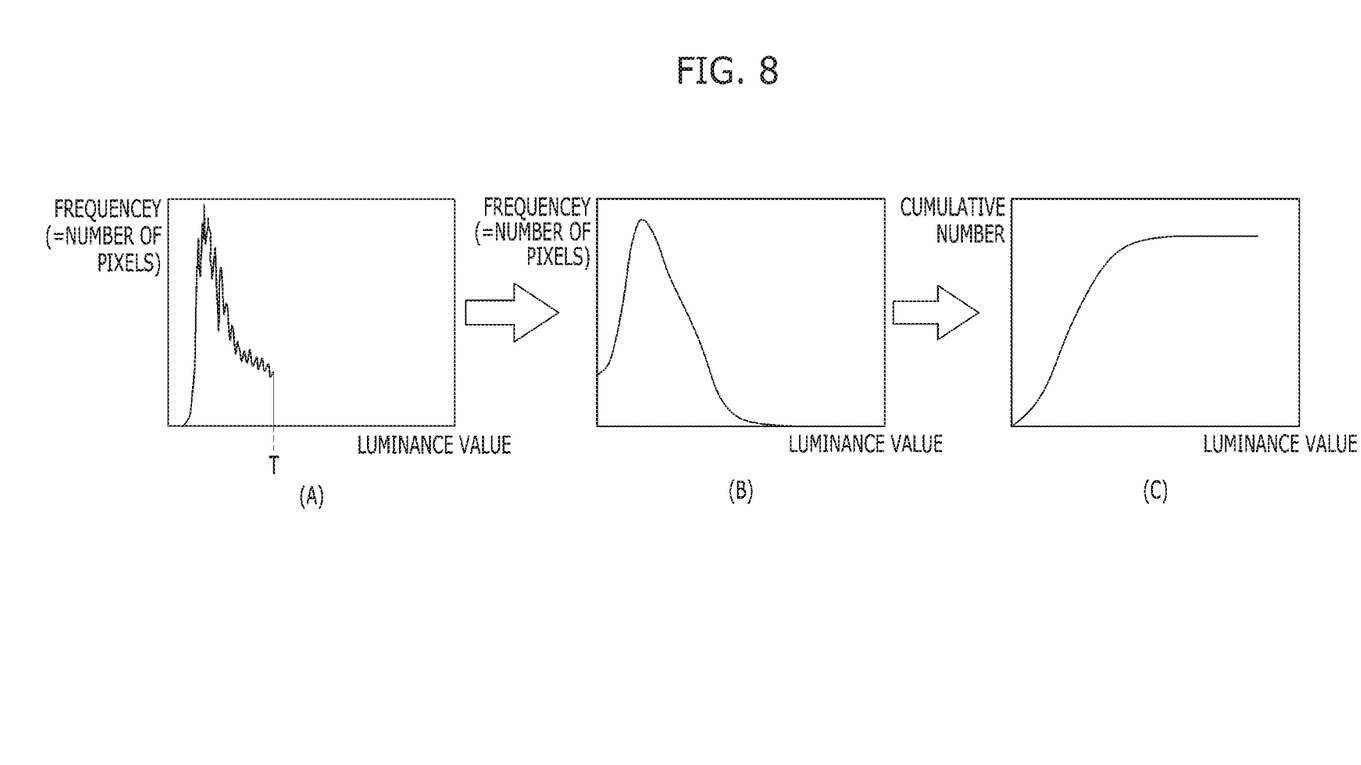
FIG. 8 is a diagram illustrating an operation of a histogram generation block, such as that illustrated in FIG. 3.

The tone mapping information generation block 323 may generate the first and second tone mapping information TM1 and TM2 based on the first and second clustered histograms HC1 and HC2 (refer to FIG. 8). The first tone mapping information TM1 may include the first tone mapping curve corresponding to the first clustered histogram HC1. The second tone mapping information TM2 may include the second tone mapping curve corresponding to the second clustered histogram HC2. Each of the first and second tone mapping curves may correspond to the cumulative number of pixels of respective luminance values.

Figure 5:
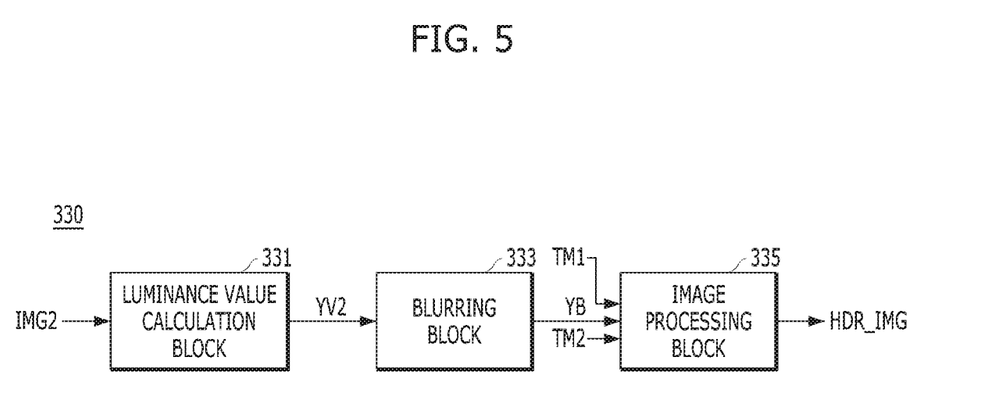
FIG. 5 is a block diagram illustrating an HDR image generation module, such as that illustrated in FIG. 2.

FIG. 5 is a block diagram illustrating the HDR image generation module 330 illustrated in FIG. 2.

Referring to FIG. 5, the HDR image generation module 330 may include a luminance value calculation block 331, a blurring block 333 and an image processing block 335.

Figure 10:
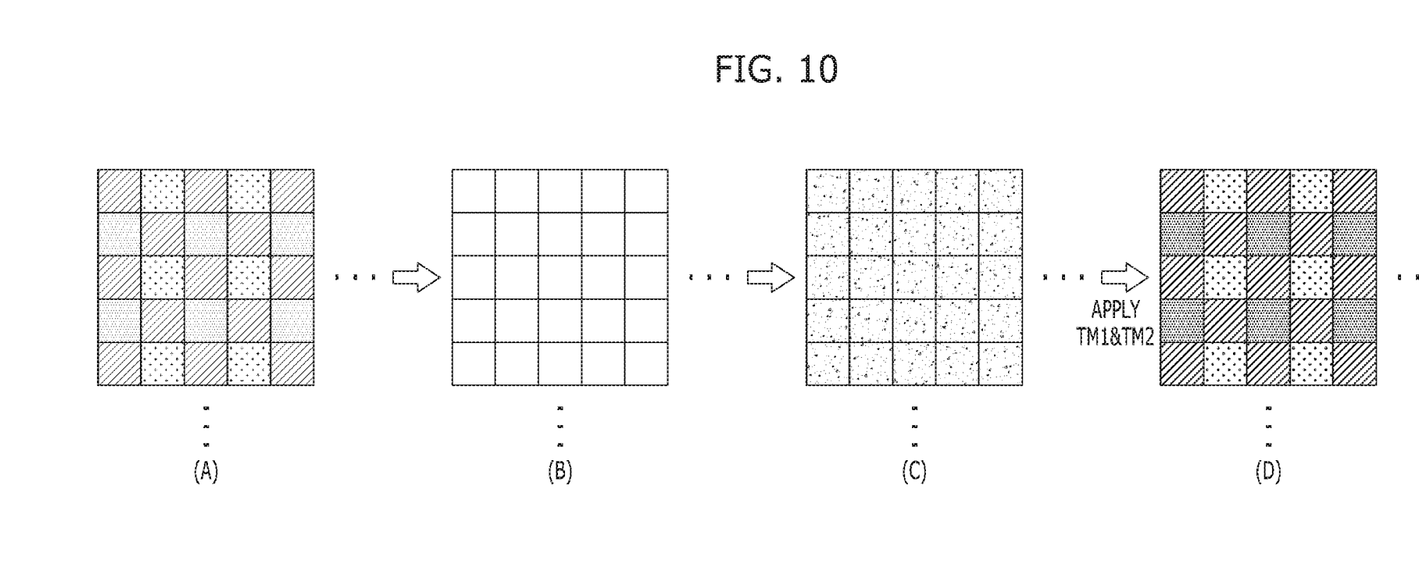
FIG. 10 is a diagram illustrating an operation of a HDR image generation module, such as that illustrated in FIG. 2.

The luminance value calculation block 331 may calculate the luminance value for each pixel of the second image IMG2 (refer to (A) and (B) of FIG. 10). The luminance value calculation block 331 may operate in the same manner as the luminance value calculation block 311 described above with reference to FIG. 3.

The blurring block 333 may generate a blurred code value YB for each pixel based on luminance values YV2 calculated by the luminance value calculation block 331 (refer to (C) of FIG. 10).

The image processing block 335 may generate the HDR image HDR_IMG based on the blurred code values YB generated by the blurring block 333 and the first and second tone mapping information TM1 and TM2.

Hereinafter, an operation of the image sensing device in accordance with an embodiment, which has the above-described configuration, is described with reference to FIGS. 6 to 10.

FIG. 6 is a diagram illustrating an operation of the histogram generation module 310 included in the image sensing device.

Referring to FIG. 6, the first image IMG1 may be represented by the digital values generated according to the arrangement of the plurality of pixels, i.e., the Bayer pattern, as illustrated in (A).

The histogram generation module 310 may generate the luminance values, which correspond to the plurality of pixels, based on the digital values, as illustrated in (B) of FIG. 6. For example, the histogram generation module 310 may calculate a luminance value of a target pixel based on digital values of pixels arranged in 3×3 on a basis of the target pixel. When a luminance value P22 of a pixel arranged at the intersection of a second row and a second column is calculated, the luminance value P22 of the pixel may be calculated using the following Equation 1.

$$P22=(P11+P13+4*P22+P31+P33)+2*(P12+P32)+2*(P21+P23)/16 \quad \text{[Equation 1]}$$

The histogram generation module 310 may generate the histogram HIST based on the calculated luminance values, as illustrated in (C) of FIG. 6. The histogram HIST may refer to the frequency of pixels, that is, the number of pixels, with respect to luminance values.

Figure 7:
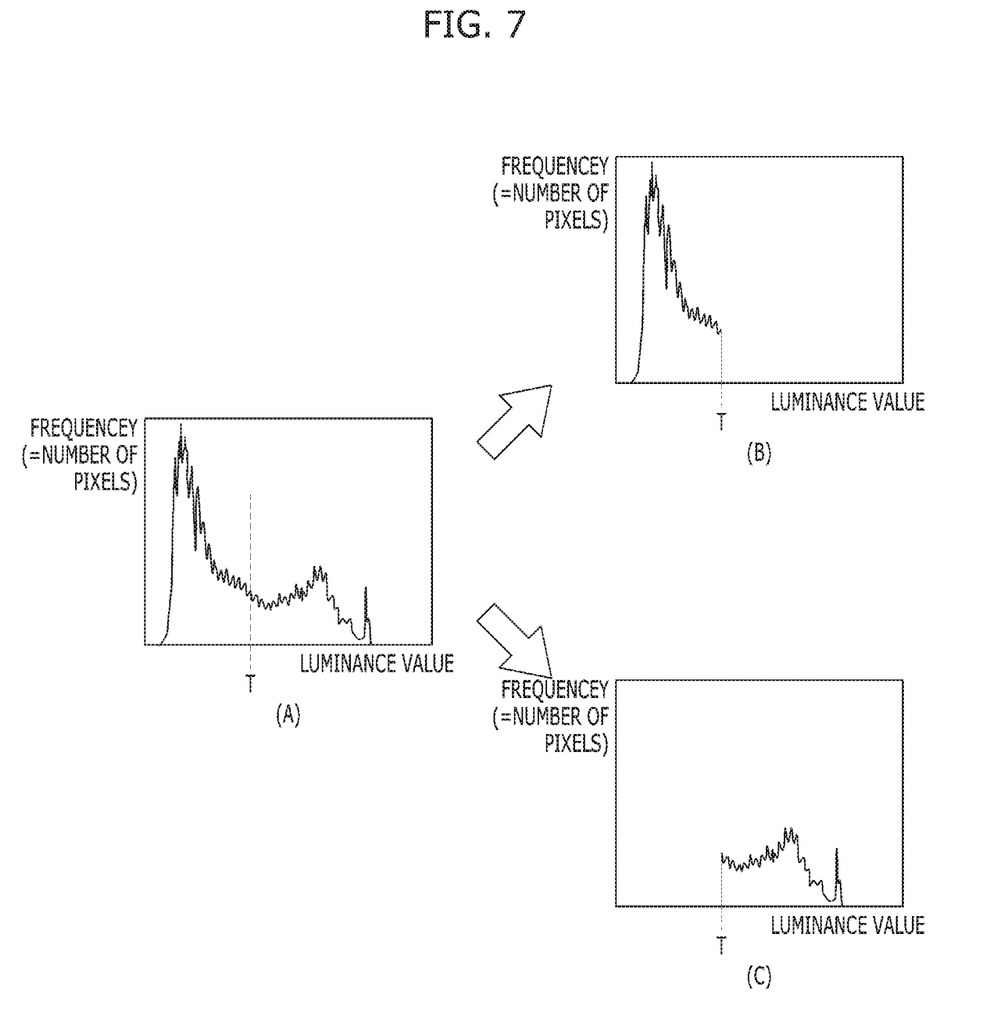
FIG. 7 is a diagram illustrating an operation of a clustering block, such as that illustrated in FIG. 3.
Figure 9:
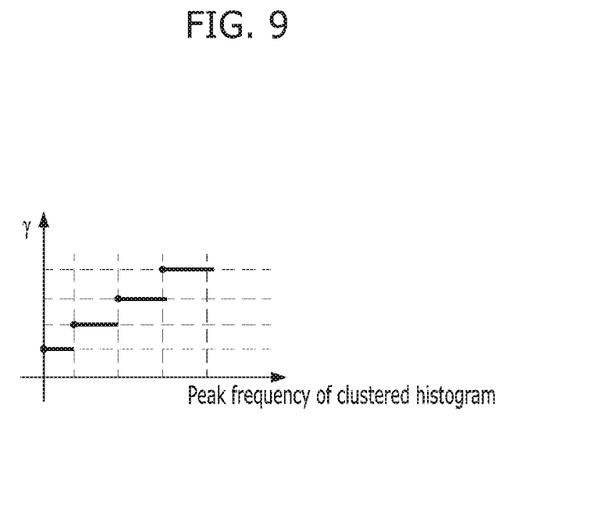
FIG. 9 is a diagram illustrating an operation of a tone mapping curve generation block, such as that illustrated in FIG. 3.

FIGS. 7 to 9 are diagrams illustrating an operation of the tone mapping module 320 included in the image sensing device.

FIG. 7 is a diagram illustrating an operation of the clustering block 321 included in the tone mapping module 320.

Referring to FIG. 7, the clustering block 321 may generate the first and second clustered histograms HC1 and HC2 according to the threshold luminance value T based on the histogram HIST. For example, the clustering block 321 may count the frequency of pixels with respect to luminance values based on the histogram HIST, and extract the threshold luminance value T when the count result indicates that the frequency of pixels corresponds to half of the total number of pixels, as illustrated in (A) of FIG. 6. In addition, the clustering block 321 may generate the first clustered histogram HC1 indicating the frequency of pixels with respect to relatively low luminance values on a basis of the threshold luminance value T, as illustrated in (B) of FIG. 6, and generate the second clustered histogram HC2 indicating the frequency of pixels with respect to relatively high luminance values on a basis of the threshold luminance value T, as illustrated in (C).

FIG. 8 is a diagram illustrating an operation of the tone mapping information generation block 323 included in the tone mapping module 320, and FIG. 9 is a diagram additionally illustrating the operation of the tone mapping information generation block 323 illustrated in FIG. 8. Hereinafter, by way of example, a process of generating the first tone mapping information TM1 based on the first clustered histogram HC1 is described.

The tone mapping information generation block 323 may generate the first tone mapping information TM1 based on the first clustered histogram HC1. The tone mapping information generation block 323 may receive the first clustered histogram HC1, as illustrated in (A) of FIG. 8, and generate a first smoothed histogram based on the first clustered histogram HC1, as illustrated in (B) of FIG. 8. A process of generating the first smoothed histogram is described in detail below.

The tone mapping information generation block 323 may generate a first modified histogram, which corresponds to the first clustered histogram HC1, according to a stretching scheme. For example, the tone mapping information generation block 323 may generate the first modified histogram by adaptively adjusting a stretching degree of the first clustered histogram HC1 based on a peak value of the frequency of pixels included in the first clustered histogram HC1. The first modified histogram may be generated using the following Equation 2.

$$\text{HIST1\_modification(code)}=\lambda*\text{HC1(code)}+(1-\lambda)*\text{HIST\_uniform(code)} \quad \text{[Equation 2]}$$

Herein, "HIST1_modification(code)" may refer to a frequency corresponding to each of the luminance values in the first modified histogram. "$\lambda$" may refer to a stretching degree. As illustrated in FIG. 9, as the peak value increases, "$\lambda$" increases. "HC1(code)" may refer to a frequency corresponding to each of the luminance values in the first clustered histogram HC1. "HIST_uniform(code)" may refer to a histogram having a uniform frequency. The "HIST_uniform (code)" may be generated using the following Equation 3.

$$\text{HIST\_uniform(code)}=m*n/\text{max\_code} \quad \text{[Equation 3]}$$

Herein, "m*n" may refer to the total number of pixels. "max_code" may refer to a maximum luminance value within the range of the luminance values in the histogram HIST.

The tone mapping information generation block 323 may generate the first smoothed histogram, which corresponds to the first modified histogram, according to a smoothing scheme. The first smoothed histogram may be generated using the following Equation 4.

$$\text{HIST1\_smoothing(code)}=\text{convolution}(\text{HIST1\_modification(code),line\_filter(tap)}) \quad \text{[Equation 4]}$$

Herein, "HIST1_smoothing(code)" may refer to a frequency corresponding to each of the luminance values in the first smoothed histogram. "HIST1_modification(code)" may refer to the frequency corresponding to each of the luminance values in the first modified histogram. "line_filter (tap)" may determine a range of the luminance values included in the first modified histogram, according to a value set in "tap". "convolution(HIST1_modification(code), line_filter(tap))" may refer to an average value of frequencies within the range of the luminance values in the first modified histogram, which is determined according to the value set in "tap".

The tone mapping information generation block 323 may generate the first tone mapping information TM1 including the first tone mapping curve, based on the first modified histogram and the first smoothed histogram, as illustrated in (C) of FIG. 8. The first tone mapping curve may correspond to the cumulative number of pixels according to the luminance values. The first tone mapping curve may be generated using the following Equation 5.

$$\text{TM1\_curve(code)} = \sum_{i=0}^{code} \text{HIST1\_smoothing}(i) \quad \text{[Equation 5]}$$

Herein, "TM1_curve(code)" may refer to a frequency corresponding each of the luminance values included in the first tone mapping curve.

$$"\sum_{i=0}^{code} HIST1\_smoothing(i)"$$

may refer to a cumulative number obtained by adding up the frequencies corresponding the luminance values in the first smoothed histogram.

As another example, the tone mapping information generation block 323 may omit the process of generating the first smoothed histogram. That is, the tone mapping information generation block 323 may generate the first tone mapping information TM1 including the first tone mapping curve, using the following Equation 6.

$$TM1\_curve(code) = \sum_{i=0}^{code} HIST1\_org(i) \qquad \text{[Equation 6]}$$

Herein, $$"\sum_{i=0}^{code} HIST1\_org(i)"$$

may refer to a cumulative number obtained by adding up the frequencies corresponding the luminance values included in the first clustered histogram HC1.

The tone mapping information generation block 323 may generate the second tone mapping information TM2 including the second tone mapping curve, in the same manner as described above, based on the second clustered histogram HC2.

FIG. 10 is a diagram illustrating an operation of the HDR image generation module 330 included in the image sensing device.

Referring to FIG. 10, the HDR image generation module 330 may generate the luminance values YV2, which correspond to the plurality of pixels, as illustrated in (B) of FIG. 10, based on digital values representing the second image IMG2 as illustrated in (A) of FIG. 10. Since a process of generating the luminance values YV2 is the same as the operation of the histogram generation module 310 described above, detailed description thereon is omitted here.

The HDR image generation module 330 may generate the blurred code value for each pixel based on the luminance values YV2, as illustrated in (C) of FIG. 10. For example, the HDR image generation module 330 may calculate an average value of luminance values of 5×5 pixels on a basis of a target pixel, and generate the average value as the blurred code value.

The HDR image generation module 330 may generate the HDR image HDR_IMG based on the blurred code values YB and the first and second tone mapping information TM1 and TM2, as illustrated in (D). For example, the HDR image generation module 330 may generate the HDR image HDR_IMG by calculating a gain for each pixel, and reflecting each gain in each of the luminance values YV2 included in the second image IMG2. The gain may be calculated using the following Equation 7.

$$g(i,j)=(1-w(i,j))*TM1(Y\_blur(i,j))+w(i,j)*TM2(Y\_blur(i,j)) \qquad \text{[Equation 7]}$$

Herein, "g(i,j)" may refer to a gain of a pixel arranged at the intersection of an $i^{th}$ row and a $j^{th}$ column. "w(i,j)" may refer to a weight of the pixel arranged at the intersection of the $i^{th}$ row and the $j^{th}$ column. "TM1(Y_blur(i,j))" may refer to a frequency of the first tone mapping curve corresponding to a blurred code value of the pixel arranged at the intersection of the $i^{th}$ row and the $j^{th}$ column. "TM2(Y_blur(i,j))" may refer to a frequency of the second tone mapping curve corresponding to the blurred code value of the pixel arranged at the intersection of the $i^{th}$ row and the $j^{th}$ column.

The weight may be calculated using the following Equation 8.

$$w(i,j)=(Y\_blur(i,j)-\min(Y\_pre\_frame))/\max(Y\_pre\_frame)-\min(Y\_pre\_frame) \qquad \text{[Equation 8]}$$

"w(i,j)" may refer to the weight of the pixel arranged at the intersection of the $i^{th}$ row and the $j^{th}$ column. "Y_blur (i,j)" may refer to the blurred code value of the pixel arranged at the intersection of the $i^{th}$ row and the $j^{th}$ column. "min(Y_pre_frame)" may refer to a minimum value of the luminance values YV1 in the first image IMG1. "max (Y_pre_frame)" may refer to a maximum value of the luminance values YV1 in the first image IMG1.

To sum up, an operating method of the image sensing device is as follows. The operating method of the image sensing device may include generating the histogram HIST based on the first image IMG1, through the global tone mapping scheme (refer to FIG. 6), generating the first and second tone mapping information TM1 and TM2, which are divided according to luminance, based on the histogram HIST, through the local tone mapping scheme (refer to FIGS. 7 to 9), and generating the HDR image HDR_IMG based on the first and second tone mapping information TM1 and TM2 and the second image IMG2 (refer to FIG. 10).

The generating of the first and second tone mapping information TM1 and TM2 may include generating the first and second clustered histograms HC1 and HC2 according to the threshold luminance value T based on the histogram HIST; generating the first and second modified histograms, which correspond to the first and second clustered histograms HC1 and HC2, respectively, according to the stretching scheme; generating the first and second smoothed histograms, which correspond to the first and second modified histograms, respectively, according to the smoothing scheme; and generating the first and second tone mapping information TM1 and TM2 including the first and second tone mapping curves, based on the first and second smoothed histograms.

As another example, the generating of the first and second tone mapping information TM1 and TM2 may include generating the first and second clustered histograms HC1 and HC2 according to the threshold luminance value T based on the histogram HIST; and generating the first and second tone mapping information TM1 and TM2 including the first and second tone mapping curves, based on the first and second clustered histograms HC1 and HC2, respectively.

In the present embodiment, an example is described, in which the histogram HIST and the first and second tone mapping information TM1 and TM2 are generated using the first image IMG1 corresponding to the previous frame. The example may apply to shooting a video. In contrast, in the case of taking a still photograph, the histogram HIST and the first and second tone mapping information TM1 and TM2 may be generated using the second image IMG2 corresponding to the current frame.

According to an embodiment of the present disclosure, as a histogram corresponding to an entire image is generated according to the global tone mapping scheme, and a first tone mapping curve for improving a relatively dark region and a second tone mapping curve for improving a relatively light region are generated according to the local tone mapping scheme, disadvantages of the global tone mapping scheme and the local tone mapping scheme individually may be compensated by using both schemes. In addition, according to an embodiment of the present disclosure, since the first and second tone mapping curves are generated according to luminance, local contrast may be further improved as compared with the local tone mapping scheme in the related art in which a tone mapping curve is generated simply for each region.

According to an embodiment of the present disclosure, a semi-global tone mapping scheme in which a global tone mapping scheme and the local tone mapping scheme are used, thereby overcoming a limitation of improvement in contrast, which is a disadvantage of the global tone mapping scheme, and a limitation of improvement in a hardware resource, which is a disadvantage of the local tone mapping scheme.

While the present disclosure has been illustrated and described with respect to specific embodiments, none of the disclosed embodiments nor any particular description is intended to be restrictive. Further, it is noted that the present invention may be achieved in various ways through substitution, change, and modification, as those skilled in the art will recognize in light of the present disclosure. The present invention encompasses all such variations that fall within the scope of the claims.

What is claimed is:

1. An image sensing device comprising:
a tone mapping component configured to generate, based on a previously-stored histogram, two or more pieces of tone mapping information, which are divided according to luminance; and
a high dynamic range (HDR) image generation component configured to generate an HDR image based on the tone mapping information and an image,
wherein the tone mapping component includes:
a cluster configured to generate, based on the histogram, two or more clustered histograms according to at least one threshold luminance value; and
a tone mapping information generator configured to generate the tone mapping information based on the clustered histograms.

2. The image sensing device of claim 1,
wherein the cluster counts a frequency of pixels within the histogram with respect to luminance values, and
wherein the cluster generates the clustered histograms such that the number of the pixels within each of the clustered histograms is the same.

3. The image sensing device of claim 1,
wherein the tone mapping information generator generates, based on the clustered histograms, the tone mapping information including two or more tone mapping curves, and
wherein each of the tone mapping curves corresponds to a cumulative number of pixels with respect to luminance values.

4. The image sensing device of claim 1, wherein the HDR image generation component includes:
a luminance value calculator configured to calculate a luminance value for each pixel of the image;
a blurring circuit configured to generate a blurred code value for each pixel based on the luminance values calculated by the luminance value calculator; and
an image processing circuit configured to generate the HDR image based on the blurred code values generated by the blurring block and the tone mapping information.

5. The image sensing device of claim 1, further comprising a histogram generation component configured to generate the histogram indicating a frequency of pixels according to luminance values, based on a previous image corresponding to a previous frame.

6. The image sensing device of claim 5, wherein the histogram generation component includes:
a luminance value calculator configured to calculate the luminance value for each pixel of the previous image; and
a histogram generator configured to generate the histogram based on the luminance values calculated by the luminance value calculator.

7. An image sensing device comprising:
an image sensor including a plurality of pixels and configured to generate an image based on incident light; and
an image processor configured to generate a high dynamic range (HDR) image based on the image and two or more pieces of tone mapping information, which are divided according to luminance,
wherein the image processor includes:
a tone mapping component configured to generate the tone mapping information based on a previously-stored histogram; and
an HDR image generation component configured to generate the HDR image based on the tone mapping information and the image, and
wherein the tone mapping component includes:
a cluster configured to generate, based on the histogram, two or more clustered histograms according to at least one threshold luminance value; and
a tone mapping information generator configured to generate the tone mapping information based on the clustered histograms.

8. The image sensing device of claim 7,
wherein the cluster counts a frequency of pixels within the histogram according to luminance values based on the histogram, and
wherein the cluster generates the clustered histograms such that the number of pixels within each of the clustered histograms is the same.

9. The image sensing device of claim 7,
wherein the tone mapping information generator generates, based on the clustered histograms, the tone mapping information including two or more tone mapping curves, and
wherein each of the tone mapping curves corresponds to a cumulative number of pixels with respect luminance values.

10. The image sensing device of claim 7, wherein the HDR image generation component includes:
a luminance value calculator configured to calculate a luminance value for each pixel of the image;
a blurring block configured to generate a blurred code value for each pixel based on the luminance values calculated by the luminance value calculator; and an image processing circuit configured to generate the HDR image based on the blurred code values generated by the blurring block and the tone mapping information.

11. The image sensing device of claim 7, further comprising a histogram generation component configured to generate the histogram indicating a frequency of pixels according to luminance values, based on a previous image corresponding to a previous frame.

12. The image sensing device of claim 11, wherein the histogram generation component includes:
   a luminance value calculator configured to calculate the luminance value for each pixel of the previous image; and
   a histogram generator configured to generate the histogram based on the luminance values calculated by the luminance value calculator.

13. An operating method of an image sensing device, comprising:
   generating a histogram based on a first image according to a global tone mapping scheme;
   generating, based on the histogram, two or more pieces of tone mapping information, which are divided according to luminance, according to a local tone mapping scheme; and
   generating a high dynamic range (HDR) image based on the tone mapping information and a second image, wherein the generating of the tone mapping information includes:
   generating, based on the histogram, two or more clustered histograms according to at least one threshold luminance value;
   generating, according to a stretching scheme, modified histograms corresponding to the clustered histograms;
   generating, according to a smoothing scheme, smoothed histograms corresponding to the modified histograms; and
   generating, based on the smoothed histograms, the tone mapping information including two or more tone mapping curves.

14. The operating method of claim 13, wherein the first image corresponds to a previous frame, and the second image corresponds to a current frame.

15. The operating method of claim 13, wherein each of the first and second images corresponds to a current frame.

16. The operating method of claim 13, wherein the generating of the tone mapping information includes:
   generating, based on the histogram, two or more clustered histograms according to at least one threshold luminance value; and
   generating, based on the clustered histograms, the tone mapping information including two or more tone mapping curves.

* * * * *